(12) United States Patent
Kohli et al.

(10) Patent No.: US 7,231,181 B2
(45) Date of Patent: Jun. 12, 2007

(54) PEN-TYPE WIRELESS TRANSCEIVER FOR MOBILE COMMUNICATION TERMINAL USING BLUETOOTH

(76) Inventors: Paramjit Kohli, 15 Grace Street, Cranbourne (AU) 3977; Seok Ki Kim, 1016 Uni-Tech Vil. 1141-2 Baekseok-Dong, Ilsan-Gu, Koyang-Si Kyonggi-Do (KR) 411-722

( * ) Notice: Subject to any disclaimer, the term of this patent is extended or adjusted under 35 U.S.C. 154(b) by 139 days.

(21) Appl. No.: 10/904,399

(22) Filed: Nov. 8, 2004

(65) Prior Publication Data
US 2006/0046650 A1 Mar. 2, 2006

(30) Foreign Application Priority Data
Aug. 24, 2004 (KR) .................... 10-2004-0066604

(51) Int. Cl.
*H04B 7/00* (2006.01)
(52) U.S. Cl. .................... 455/41.2; 455/66.1; 455/351; 345/179

(58) Field of Classification Search ............ 455/575.1, 455/41.2, 41.3, 66.1, 351; 345/179
See application file for complete search history.

(56) References Cited

U.S. PATENT DOCUMENTS

| 6,130,666 | A | * | 10/2000 | Persidsky | .................. 345/179 |
| 6,311,042 | B1 | * | 10/2001 | DeSchrijver | ............... 455/66.1 |
| 2002/0175903 | A1 | * | 11/2002 | Fahraeus et al. | ............ 345/179 |
| 2003/0138284 | A1 | * | 7/2003 | Burden et al. | .............. 401/194 |

\* cited by examiner

*Primary Examiner*—Matthew D. Anderson
*Assistant Examiner*—Sanh Phu
(74) *Attorney, Agent, or Firm*—Blumenfeld Kaplan & Sandweiss, P.C.

(57) ABSTRACT

Disclosed herein is a pen-type wireless transceiver for a mobile communication terminal using Bluetooth. The pen-type wireless transceiver includes a pen type body, an LED, a pattern type antenna, a speaker, an LCD display, a button unit, a battery, a microphone, a Bluetooth controller, an audio interface, a main board, a battery supervisor, a replaceable ballpoint ink container, a locking projection, threaded parts, a pen clip and a guard pad.

6 Claims, 3 Drawing Sheets

PEN-TYPE WIRELESS TRANSCEIVER FOR MOBILE COMMUNICATION TERMINAL USING BLUETOOTH

BACKGROUND OF THE INVENTION

1. Field of the Invention

The present invention relates generally to a pen-type wireless transceiver for a mobile communication terminal using Bluetooth.

2. Description of the Related Art

Conventional mobile communication terminals are chiefly employing Infrared Data Association (IrDA) technology. In accordance with the IrDA technology, focused light in an infrared frequency band, along with information, is modulated and can be transmitted from a transmitter to a receiver. However, a device employing the IrDA technology has a limited narrow angle (30°) and does not have an embedded security function.

IrDA is the specification of a method of exchanging information between a mobile communication terminal (hereinafter referred to as a "mobile phone") and a communication instrument using an available protocol. The information includes phone directories, schedules and message information. IrDA includes the Infrared Mobile Communication (IrMC) protocol including the rules for processing call control and real-time voice processing. The applications of IrDA are limited to the transmission of documents from a notebook computer to a printer, the exchange of business cards between Personal Digital Assistants (PDAs), the synchronization of schedules and directories between a desktop computer and a PDA, the transmission of photographs from a digital camera to a computer, etc. The application of IrDA between a mobile phone and a wireless earphone is not recommended.

Accordingly, a user of a conventional earphone for a mobile phone generally performs communications while connecting the earphone to the mobile phone by a cable. However, this scheme is disadvantageous in that the earphone is large, and danger may occur in the case where the user is carrying heavy baggage with both hands or driving a car.

Recently, technology using Bluetooth has become widely used. Bluetooth is an ad-hoc technology that is used for short-distance wireless communications. Bluetooth employs Radio Frequencies (RF) and, therefore, must be allocated a frequency band. However, Bluetooth uses the Industrial, Scientific and Medical (ISM) band, so that additional authorization is not required, thus being widely used.

Currently, a call can be made using a headset without holding a mobile phone by connecting the headset to the mobile phone. The headset can be wirelessly connected to the mobile phone using Bluetooth technology.

A call can be put through to the user when the call comes in, or can be disconnected by pressing a button of the headset while the mobile phone remains held in a pocket or bag. A call can be made using a Voice Activated Dialing (VAD) function without contact with a mobile phone. There is an ear-microphone, which is a wireless communication-related product, employing Bluetooth and is so connected to a mobile phone. The ear-microphone is used to wirelessly take a call received by a mobile phone. When a ring tone is issued or vibration is detected, a call is taken using the ear-microphone worn around a user's ear. After the call is terminated, the ear-microphone is folded and carried, or may be continuously worn on the user's ear. The ear-microphone is generally used by persons engaging in phone-related service business. From the aspects of the shape and function thereof, the ear-microphone is disadvantageous in that it is not applied to the lives of ordinary people and is not typically used by the general population.

SUMMARY OF THE INVENTION

Accordingly, the present invention has been made keeping in mind the above problems occurring in the prior art, and an object of the present invention is to provide a pen-type wireless transceiver for a mobile phone using Bluetooth, which is equipped with a caller ID function. The device can not only receive calls but can also make calls while searching a stored phone directory for desired phone numbers. It consumes a small amount of power because it employs Bluetooth, is easy to carry and charge because a standard battery is employed, and is equipped with a low power alarm function.

In order to accomplish the above object, the present invention provides a pen-type wireless transceiver for a mobile phone using Bluetooth, including a pen-type body comprising an upper housing configured to form the upper part of the body; a receptacle part combined with the upper housing, and a lower housing combined with the receptacle part and configured to form the lower part of the body; a Light Emitting Diode (LED) for visually indicating operational status by emitting light through an opening formed in the top of the upper housing; a pattern type antenna extended from the lower end of the LED along a part of an inside surface of the upper housing to receive and transmit RF signals so as to exchange information with a mobile phone; a speaker positioned below the pattern type antenna to communicate with and transmit a voice signal to the outside of the upper housing; a Liquid Crystal Display (LCD) display positioned below the speaker to display information about incoming calls; a button unit including Up and Down buttons positioned on the left side of the upper housing to be used to search for a stored phone number at the time of placing a call, and a Talk button positioned on the right side of the upper housing to control a call function; a battery accommodated in the receptacle part to supply power to all power-related elements; a microphone projected from the lower end of the outside surface of the receptacle part to receive the voice signal; a Bluetooth controller configured to control all the elements and is equipped with a Bluetooth chip to allow information to be exchanged with the mobile phone; an audio interface for allowing the Bluetooth controller to control the voice signal output to the speaker and the microphone; a main board inserted into the upper housing with the LED, the speaker, the LCD display, the Up, Down and Talk buttons, the Bluetooth controller and the audio interface mounted thereon; a battery supervisor mounted on the main board to measure the voltage of the battery and issue a low voltage alarm; and a replaceable ballpoint ink container contained in the lower housing to function as a writing instrument.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
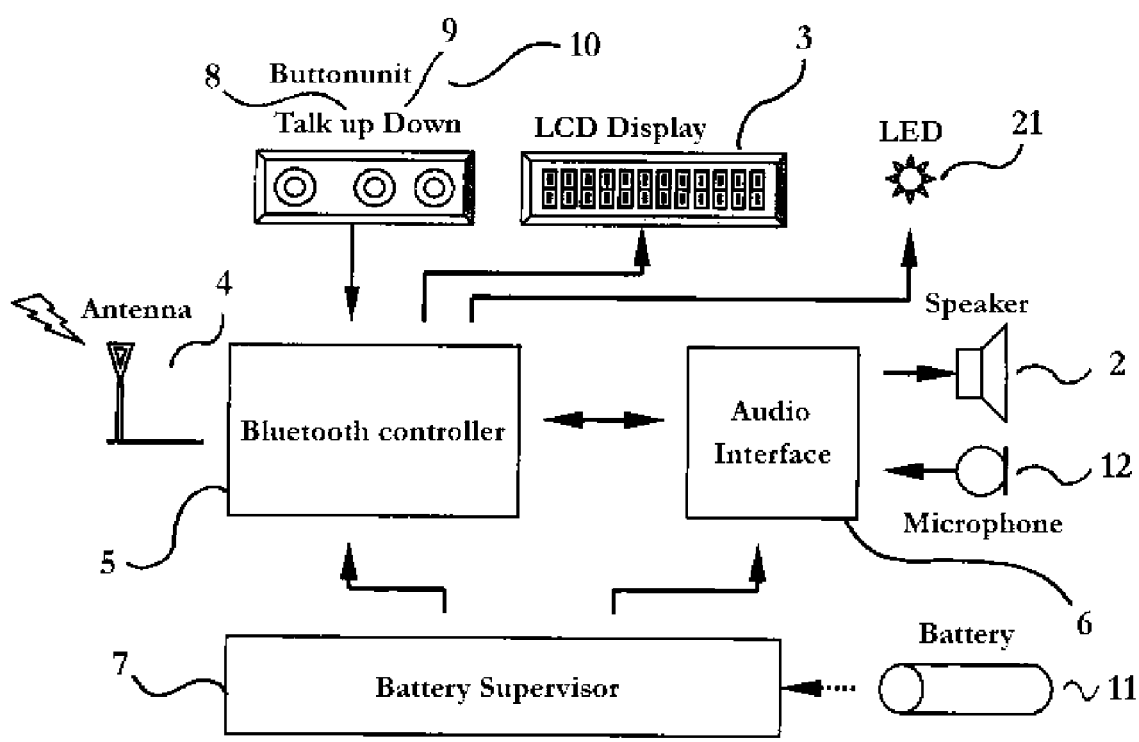
FIG. 1 is a block diagram showing a pen-type wireless transceiver for a mobile phone according to the present invention.

Reference now should be made to the drawings, in which the same reference numerals are used throughout the different drawings to designate the same or similar components.

Figure 2:
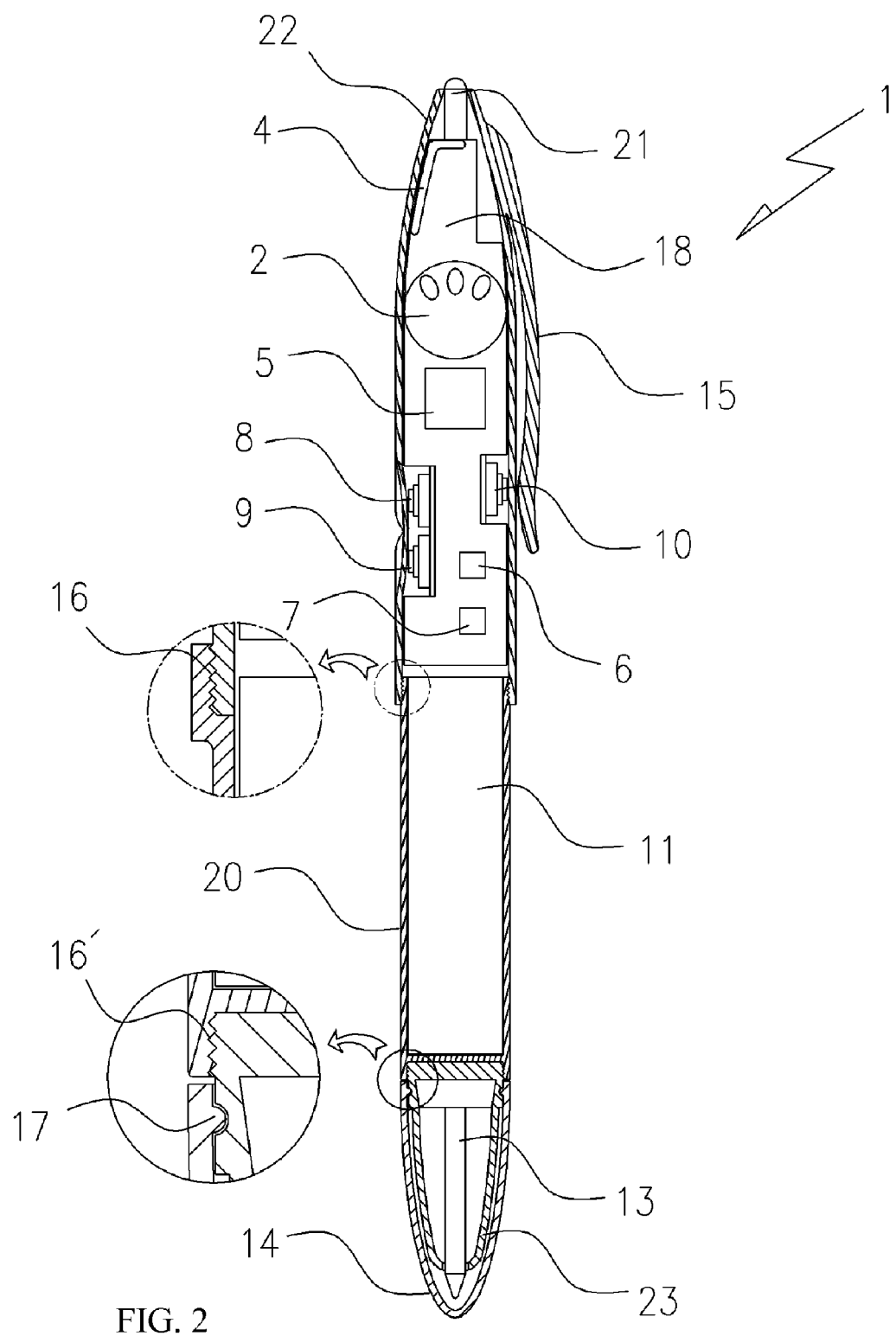
FIG. 2 is a longitudinal section of the pen-type wireless transceiver for a mobile phone.
Figure 3:
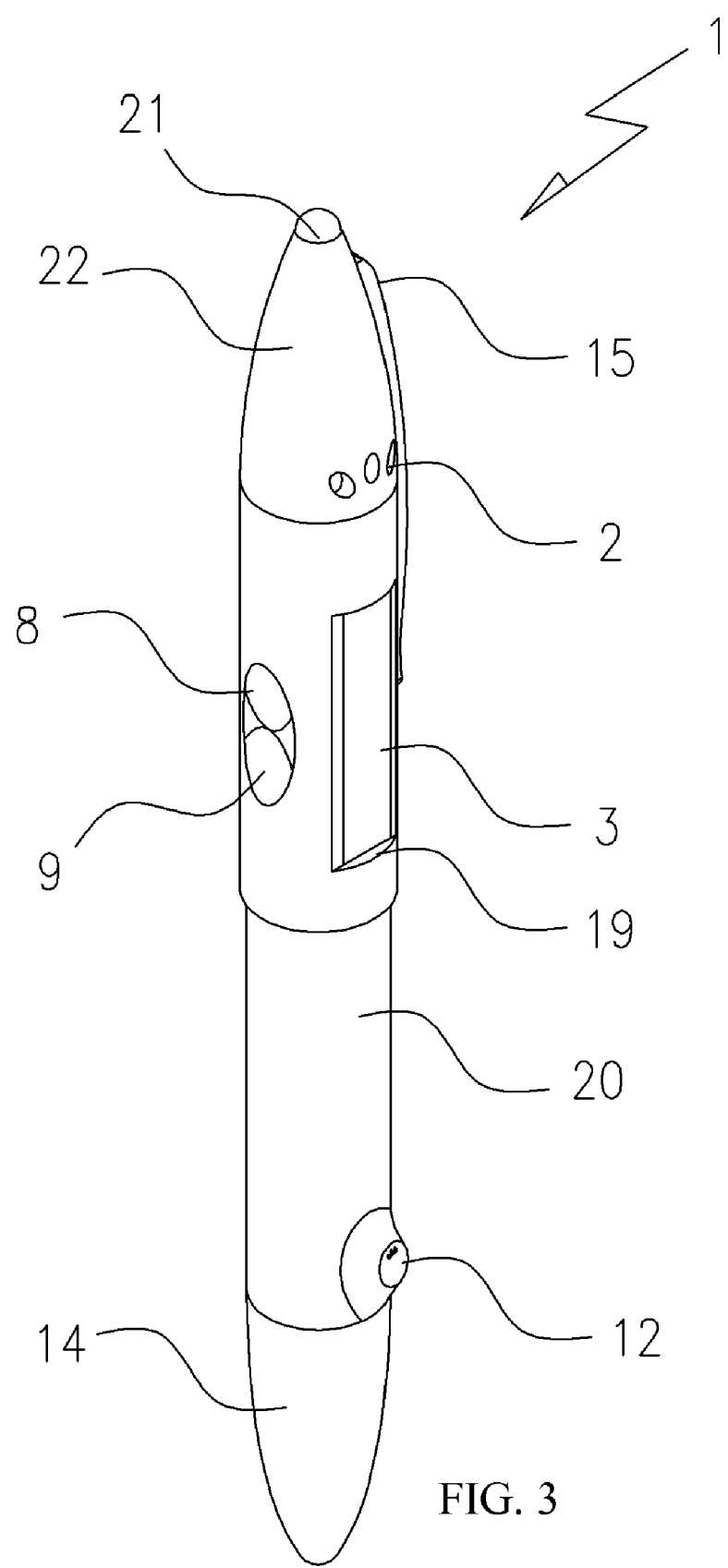
FIG. 3 is a perspective view showing the pen-type wireless transceiver for a mobile phone.

FIGS. 2 and 3 are a longitudinal section and a perspective view, respectively, showing a pen-type wireless transceiver for a mobile phone in accordance with the present invention.

The pen-type wireless transceiver for a mobile phone using Bluetooth includes a pen-type body 1, an LED 21, a pattern type antenna 4, a speaker 2, an LCD display 3, a button unit, a battery 11, a microphone 12, a Bluetooth controller 5, an audio interface 6, a main board 18, a battery supervisor 7, a replaceable ballpoint ink container 13, a locking projection 17, corresponding threaded parts 16 and 16', a pen clip 15 and a guard pad 19.

The pen-type body 1 includes an upper housing 22 configured to form the upper part of the body 1, a receptacle part 20 combined with the upper housing 22, and a lower housing 23 combined with the receptacle part 30 and configured to form the lower part of the body 1. The LED 21 visually indicates operational status by emitting light through an opening formed in the top of the upper housing 22. The pattern type antenna 4 is extended from the lower end of the LED 21 along a part of the inside surface of the upper housing 22 to receive and transmit Radio Frequency (RF) signals so as to exchange information with the mobile phone. The speaker 2 is positioned below the pattern type antenna 4 to communicate with and transmit a voice signal to the outside of the upper housing 22. The LCD display 3 is positioned below the speaker 2 to display information about incoming calls. The button unit includes Up and Down buttons 9 and 8 respectively, positioned on the left side of the upper housing 22 to be used to search for a stored phone number at the time of transmitting a call, and a Talk button 10 positioned on the right side of the upper housing 22 to control a call function. The battery 11 is accommodated in the receptacle part 20 to supply power to all power-related elements. The microphone 12 is projected from the lower end of the outside surface of the receptacle part 20 to receive the voice signal. The Bluetooth controller 5 is configured to control all the elements and is equipped with a Bluetooth chip to allow information to be exchanged with the mobile phone. The audio interface 6 allows the Bluetooth controller 5 to control the voice signal output to the speaker 2 and the microphone 12. The main board 18 is inserted into the upper housing 22 with the LED 21, the speaker 2, the LCD display 3, the Up, Down and Talk buttons 9, 8 and 10, the Bluetooth controller 5 and the audio interface 6 mounted thereon. The battery supervisor 7 is mounted on the main board 18 to measure the voltage of the battery 11 and issue a low voltage alarm. The replaceable ballpoint ink container 13 is contained in the lower housing 23 to function as a writing instrument. The pen cover 14 is attached to the lower end part of the lower housing 23 to cover the replaceable ballpoint ink chamber 13 so as to prevent the drying and leakage of ink. The locking projection 17 is formed on the upper end part of the inside surface of the pen cover 14 to allow the pen cover 14 to be fastened to the lower housing 23. The threaded parts 16 are formed on the lower end part of the outside surface of the upper housing 22 and the upper end part of the inside surface of the receptacle part 20, respectively, to allow the upper housing 22 and the receptacle part 20 to be detachably attached to each other so as to replace the battery 11. The threaded parts 16' are formed on the lower end part of the inside surface of the receptacle part 20 and the upper end part of the outside surface of the lower housing 23, respectively, to allow the receptacle part 20 and the lower housing 23 to be detachably attached to each other so as to replace the ink container 13. The pen clip 15 is provided on a side of the upper housing 22 to facilitate the pushing of the Talk button 10. The guard pad 19 is vertically provided on the outside surface of the upper housing 22 to protect the surface of the LCD display 3.

FIG. 1 is a block diagram showing a pen-type wireless transceiver for a mobile phone according to the present invention.

As shown in FIG. 1, when power is supplied from the battery 11, the battery supervisor 7 measures the voltage of the battery 11 to issue an alarm in the case of low voltage, and stably supplies power to a Bluetooth controller 5 and the audio interface 6.

The Bluetooth controller 5 equipped with a Bluetooth chip detects a signal transmitted from the antenna 4 for transmitting and receiving RF signals, and transmits a control signal to the speaker 2, the LCD 3 and the Light Emitting Diode (LED) 21 so that a user can recognize a call and see an originating phone number.

The user can control the transmitted signal, which is visually or aurally detected, through three buttons 8 to 10, and inputs and transmits the user's own voice signal through the microphone 12.

The functions of the above-described elements are described in detail below.

The battery supervisor 7 controls system power, monitors the battery 11, control element-based power and performs a battery saving function. The Bluetooth controller 5 performs all the functions relating to the Bluetooth protocol, and performs the entire control of the system (for example, RF communications, switching actions, a caller ID function, LCD display control, etc.).

The audio interface 6 converts analog sound, which enters through the microphone 12, into digital sound data, or converts received digital sound data into analog sound, and outputs the resulting digital sound source data or analog sound through the speaker 2. The LCD display 3 displays originating phone numbers and stored phone numbers. The LED 21 indicates every operational status (for example, calling, call waiting, and low battery power).

The switching buttons 8 to 10 are used to make calls, receive calls and search for stored phone numbers.

The operation of the present invention is described with reference to the accompanying drawings.

1. When receiving an incoming call

When a call comes in, an originating phone number is displayed on the LDC display 3 of the pen-type wireless transceiver for a mobile phone. If the user presses the Talk button 8 after checking the originating phone number, the call is put through to the user.

2. When making a call

When a number search button (Up or Down button 9 or 10) is pressed, a stored phone number is displayed according to the location of the button, and a call is made by pressing the Talk button 8 when a desired phone number is displayed.

3. When not wanting to answer a call

When the user does not want to answer a call after checking an originating phone number displayed on the LDC display, the user presses the Talk button for about 1 second.

4. When disconnecting a call

When the user wants to disconnect a call, the user presses the Talk button for about 1 second (in the case where a call is terminated, the call is automatically disconnected even though the Talk button is not pressed).

As described above, a pen function is additional, and has no relation to communication. The pen function is generally used to make a memorandum, take notes, or perform any other function performed by a conventional ball-point pen.

5. When alerting the user of low voltage (monitoring low battery power)

When the power of the battery 11 is low, low power status is automatically detected and the user is notified of the need to replace the battery 11 by the quick flickering of the LED 21.

6. LED status according to operations

During a call or a search for a phone number: one flicker for each second

At the time of waiting for a call: one flicker for five seconds

At the time of low battery power: three flickers for each second

Although in FIGS. 2 and 3, the pen-type wireless transceiver for a mobile phone using Bluetooth is illustrated in a specific pen shape, the pen-type wireless transceiver can be formed in various shapes within the range of pen shapes.

A pen-type body 1 is constructed so that it can be separated into the upper housing 22, the receptacle part 20 and the lower housing 23. In this case, a wire may be used as a power supply line. Alternatively, the inside of the receptacle part 20 is made of a conductor and the outside of the receptacle part 20 is made of an insulator, so that a power supply line is preferably formed when the receptacle part 20 is combined with the upper housing 22.

The pen-type wireless transceiver for a mobile phone according to the present invention is easy to carry because the pen-type wireless transceiver can be hung around the user's neck or be carried in the user's pocket. The pen-type wireless transceiver can wirelessly take calls, and make calls after the user checks transmitters' or receivers' information, which is stored in memory, through the LCD display. Moreover, the pen-type wireless transceiver is equipped with a caller ID function and a low voltage alarm function, so that the pen-type wireless transceiver performs various functions.

Although the preferred embodiment of the present invention has been disclosed for an illustrative purpose, those skilled in the art will appreciate that various modifications, additions and substitutions are possible without departing from the scope and spirit of the invention as disclosed in the accompanying claims.

What is claimed is:

1. A pen-type wireless transceiver for a mobile communication terminal using Bluetooth, comprising:
   a pen-type body comprising an upper housing configured to form an upper part of the body, a receptacle part combined with the upper housing, and a lower housing combined with the receptacle part and configured to form a lower part of the body;
   a Light Emitting Diode (LED) for visually indicating operational status by emitting light through an opening formed in a top of the upper housing;
   a pattern type antenna extended from a lower end of the LED along a part of an inside surface of the upper housing to receive and transmit Radio Frequency (RF) signals so as to exchange information with a mobile communication terminal;
   a speaker positioned below the pattern type antenna to communicate with and transmit a voice signal to an outside of the upper housing;
   a Liquid Crystal Display (LCD) display positioned below the speaker to display information about incoming calls;
   a button unit comprising Up and Down buttons positioned on a first side of the upper housing to be used to search for a stored phone number at a time of placing a call, and a Talk button positioned on a second side of the upper housing to control a call function;
   a battery accommodated in the receptacle part to supply power to all power-related elements;
   a microphone projected from a lower end of the outside surface of the receptacle part to receive the voice signal;
   a Bluetooth controller configured to control all the elements and is equipped with a Bluetooth chip to allow information to be exchanged with the mobile communication terminal;
   an audio interface for allowing the Bluetooth controller to control the voice signal output to the speaker and the microphone; a main board inserted into the upper housing with the LED, the speaker, the LCD display, the Up, Down and Talk buttons, the Bluetooth controller and the audio interface mounted thereon;
   a battery supervisor mounted on the main board to measure the voltage of the battery and issue a low voltage alarm; and
   a replaceable ballpoint ink container contained in the lower housing to function as a writing instrument.

2. The pen-type wireless transceiver as set forth in claim 1, further comprising a pen cover attached to a lower end part of the lower housing to cover the replaceable ballpoint ink chamber so as to prevent the drying and leakage of ink.

3. The pen-type wireless transceiver as set forth in claim 2, further comprising a locking projection formed on an upper end part of an inside surface of the pen cover to allow the pen cover to be fastened to the lower housing.

4. The pen-type wireless transceiver as set forth in claims 1, further comprising:
   threaded parts formed on a lower end part of an outside surface of the upper housing and an upper end part of an inside surface of the receptacle part, respectively, to allow the upper housing and the receptacle part to be detachably attached to each other so as to replace the battery; and
   threaded parts formed on a lower end part of an inside surface of the receptacle part and an upper end part of an outside surface of the lower housing, respectively, to allow the receptacle part and the lower housing to be detachably attached to each other so as to replace the ink container 13.

5. The pen-type wireless transceiver as set forth in claim 1, further comprising a pen clip provided on a side of the upper housing to facilitate a pushing of the Talk button.

6. The pen-type wireless transceiver as set forth in claims 1, further comprising a guard pad vertically provided on a part of an outside surface of the upper housing to protect a surface of the LCD display.

* * * * *